United States Patent [19]
Jonsson

[11] Patent Number: 5,961,079
[45] Date of Patent: Oct. 5, 1999

[54] SERVICE SYSTEM

[75] Inventor: Lennart C. B. Jonsson, Höllviksnäs, Sweden

[73] Assignee: Combi Box System Scandinavia AB, Malmö, Sweden

[21] Appl. No.: 08/952,655

[22] PCT Filed: May 23, 1996

[86] PCT No.: PCT/SE96/00669

§ 371 Date: Nov. 24, 1997

§ 102(e) Date: Nov. 24, 1997

[87] PCT Pub. No.: WO96/37407

PCT Pub. Date: Nov. 28, 1996

[30] Foreign Application Priority Data

May 24, 1995 [SE] Sweden .................................. 9501930

[51] Int. Cl.⁶ .................................. B64F 1/00; B64F 1/28
[52] U.S. Cl. .................................. 244/164 R; 244/135 R; 141/392; 141/279
[58] Field of Search ........................... 244/144 R, 129.1, 244/135 R; 141/392, 279, 284

[56] References Cited

U.S. PATENT DOCUMENTS

| | | | |
|---|---|---|---|
| 2,642,957 | 6/1953 | Watts, Jr. et al. | 244/114 R |
| 2,769,575 | 11/1956 | Harman et al. | 244/114 R |
| 4,269,240 | 5/1981 | Cutore | 141/392 |
| 4,993,463 | 2/1991 | Von Meyerinck et al. | 141/279 |
| 5,149,017 | 9/1992 | McEntire et al. | 244/114 R |
| 5,595,224 | 1/1997 | Cutore | 244/135 R |

FOREIGN PATENT DOCUMENTS

| | | |
|---|---|---|
| 0 393 229 | 10/1990 | European Pat. Off. . |
| 2 231 073 | 11/1990 | European Pat. Off. . |
| 29 06 342 | 9/1979 | Germany . |
| 37 43 393 | 3/1989 | Germany . |
| WO94/00348 | 1/1994 | WIPO . |

*Primary Examiner*—Charles T. Jordan
*Assistant Examiner*—Patricia L. Zuniga
*Attorney, Agent, or Firm*—Browdy and Neimark

[57] ABSTRACT

A service system is arranged for at least one docking position for a craft, which requires the supply of various utilities and the discharge of waste. The system comprises a plurality of service boxes (3) lowered into the ground in the docking position. The service boxes each comprise a casing (9) and a cover (10) forming the top of the service box. The service boxes each accommodate a connecting device (22–26) for connecting an underground supply or discharge conduit (5) opening into the service box and connected to a utility source and a waste receiver, respectively, to a corresponding inlet and outlet, respectively, of the craft. At least one of the service boxes (3) comprises a cassette (15) accommodated in the casing (9), said cassette being liftable up from said casing when the cover (10) is removed, the connecting device (22–26) of the service box and the associated equipment, if any, being mounted in the cassette.

9 Claims, 6 Drawing Sheets

SERVICE SYSTEM

The present invention generally relates to a service system for at least one docking position for a craft such as an aircraft, a ship or the like, which requires the supply of various utilities, such as fuel, water, air and electric power, and the discharge of waste, such as wastewater.

Such service systems are previously known, for example from GB-C-2,231,073, and may comprise a plurality of service boxes lowered into the ground in the docking position, which each comprise a casing forming the side walls and the bottom of the service box, and a cover forming the top of the service box. The service boxes each accommodate a connecting device for connecting an underground supply or discharge conduit opening into the service box and connected to a utility source or a waste receiver, to a corresponding inlet or outlet of the craft.

The advantage of such a service system at an airport is that the need of vehicles on the apron is eliminated. The service boxes lowered into the ground constitute no obstacle to an aircraft on the apron, when it is not being used, but permit convenient access to, for instance, fuel, water, air and electric power, when the aircraft is parked in the docking position formed by the apron. As a result, the risk of collisions and fire on the apron is reduced. Besides, a shortened out-of-service period on the apron is rendered possible, which can be used to accomplish a better utilisation of the aircraft, i.e. a relatively seen greater amount of flying time. This implies, in turn, that the transport capacity of the airport can be increased to a considerable extent, while using the available docking positions.

The object of the present invention is to further improve a service system of the type described above, by simplifying the overhaul and repair of the system, such that the maintenance and any repairs of the system affect the operation of the system as little as possible.

According to the invention, this object is achieved in that at least one of the service boxes comprises a cassette which is accommodated in the casing and is liftable up from the casing when the cover is removed and in which the connecting device of the box and the associated equipment, if any, are mounted.

Owing to the inventive design, a more extensive overhaul or repair of the cassette can be carried out after it has been lifted up from the casing and replaced with a replacement cassette. The time during which the system is out of operation can thus be made extremely short, at the same time as the overhaul or repair of the raised cassette can be carried out without requiring work under pressure, the accessibility being considerably better than down in the casing.

To permit the cassette to be completely released from the service system, the connecting device of the cassette and the associated supply or discharge conduit suitably each have a coupling element adapted to be interconnected when lowering the cassette into the casing, and to be disconnected when raising the cassette from the casing. Preferably, each coupling element has a vertical centre axis, thereby allowing the coupling elements to take their interconnected position, when the cassette is lowered to its final position in the casing.

To prevent undesired opening of the supply or discharge conduit to the surrounding atmosphere, when the cassette is being raised from the casing, a locking means is suitably arranged for the coupling elements in the box, said locking means needing to be released, before the coupling elements can be disconnected by raising the cassette from the casing.

In order to prevent also attempts to raise the cassette from the casing before the locking means has been released, a securing means can advantageously be arranged to secure the cassette against lifting up from the casing as long as the locking means is not released. Consequently, a non-desirable overloading of the coupling elements is prevented.

At least in the case in which the supply conduit constitutes a fuel line, it can be provided, in a preferred embodiment, with a shut-off valve adjacent its coupling element, and an actuating means for the shut-off valve can be arranged to release the locking means merely in the closed position of the valve. This ensures that before raising the cassette from the casing, the shut-off valve must first be actuated to its closed position, that the locking means for the coupling elements can then be released, and that finally the securing means for the raising of the cassette from the casing can be inactivated.

In a practical embodiment of the service system, the actuating means of the shut-off valve comprises an arm which is pivotable for the shutting-off operation and which has a cam disc for generating a translational motion of the locking means.

The invention will now be described in more detail, with reference to the accompanying drawings.

Figure 1:
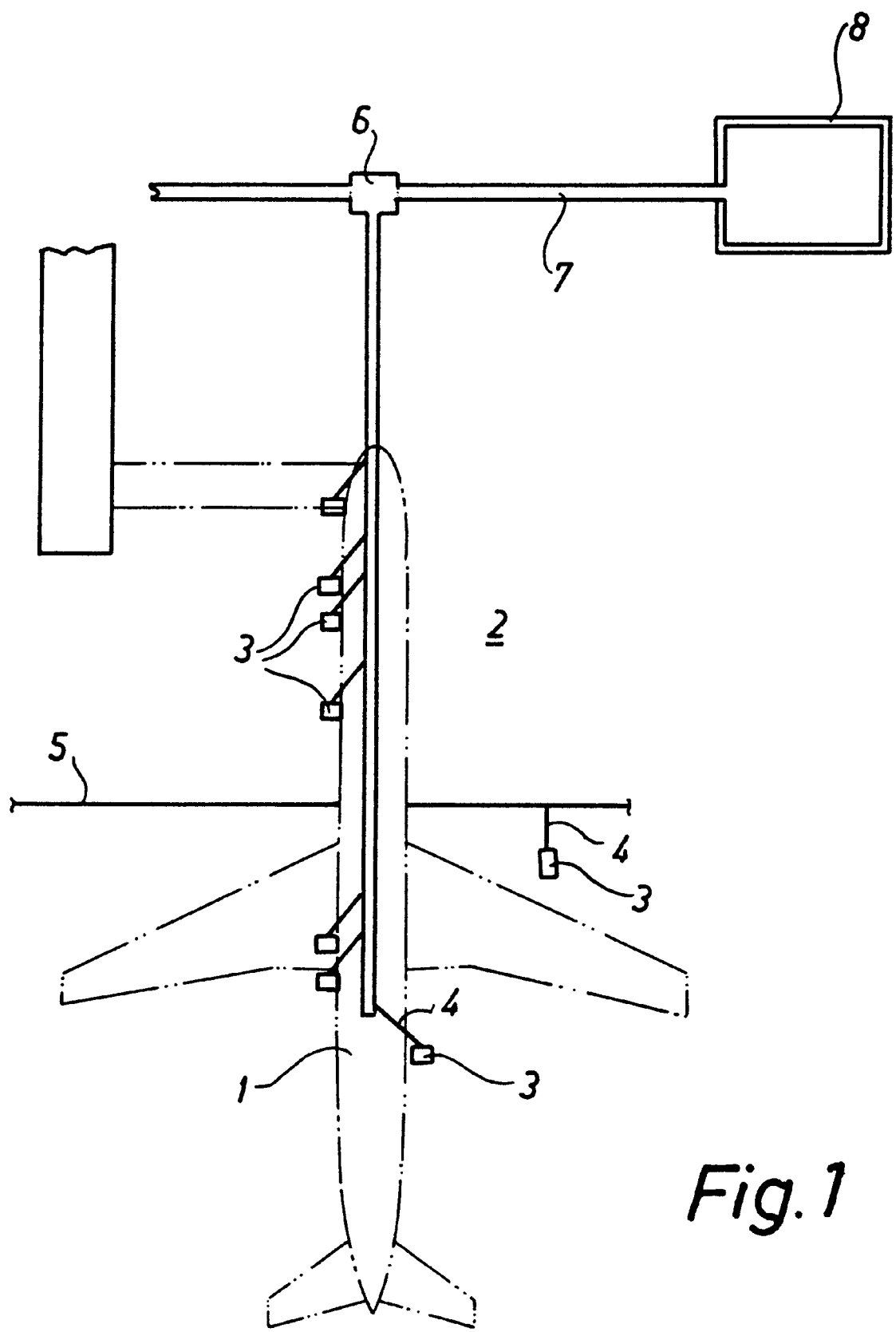
FIG. 1 is a top plan view of a docking position for an aircraft, equipped with a service system according to the present invention.

FIG. 1 illustrates an aircraft 1 parked on a apron 2 of a docking position, in which passengers are exchanged, the utilities required by the aircraft are supplied and waste is discharged. More specifically, this is carried out by means of a number of service boxes 3, which are lowered into the apron in the docking position and into each of which an underground supply or discharge conduit 4 opens. Except for a fuel supply line 5, the conduits 4 are laid to a connecting chamber 6, in which they connect to collecting pipes 7 common to a plurality of docking positions and connecting the conduits 4 to a utility source and a waste receiver, respectively, in a central unit 8.

Figure 2:
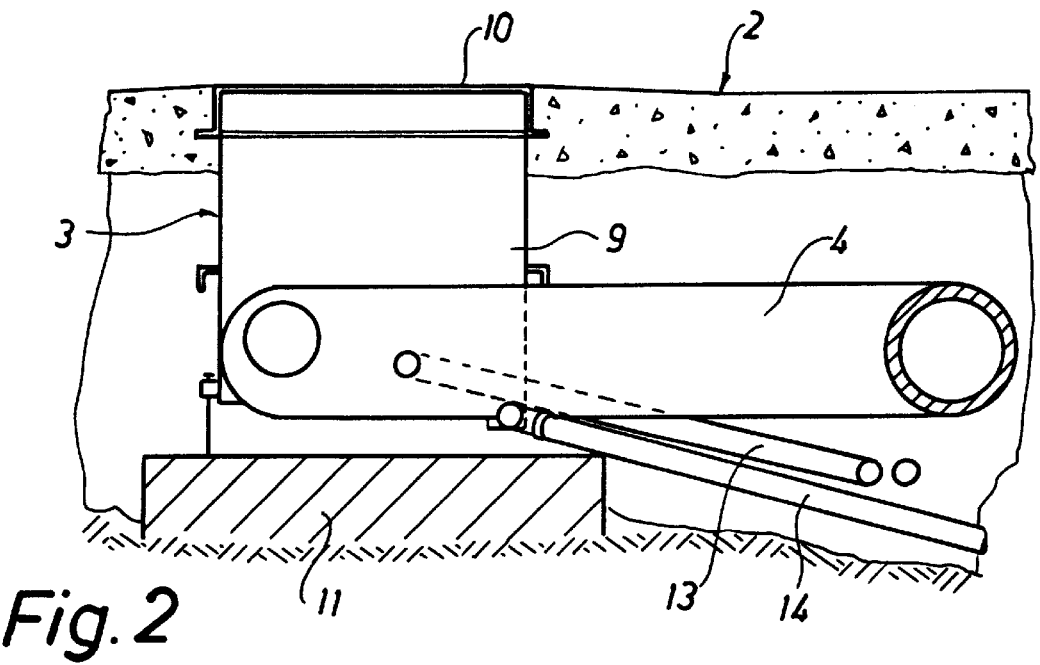
FIG. 2 is a cross-sectional view along the line II—II in FIG. 1.

The cross-sectional view in FIG. 2 shows a service box 3, which comprises a casing 9 forming the side walls and the bottom of the service box 3, and a cover 10 forming the top of the box on the same level as the surrounding ground of the apron 2. The casing 9 is, more specifically, mounted on a base 11, and the supply conduit 4 opening into the casing 9 is, in this case, intended for air for air conditioning of the passenger accommodation of the aircraft 1. Moreover, electric lines 13 extend to the casing 9, and a drain pipe 14 extends from the lowest part of the casing.

Figure 3:
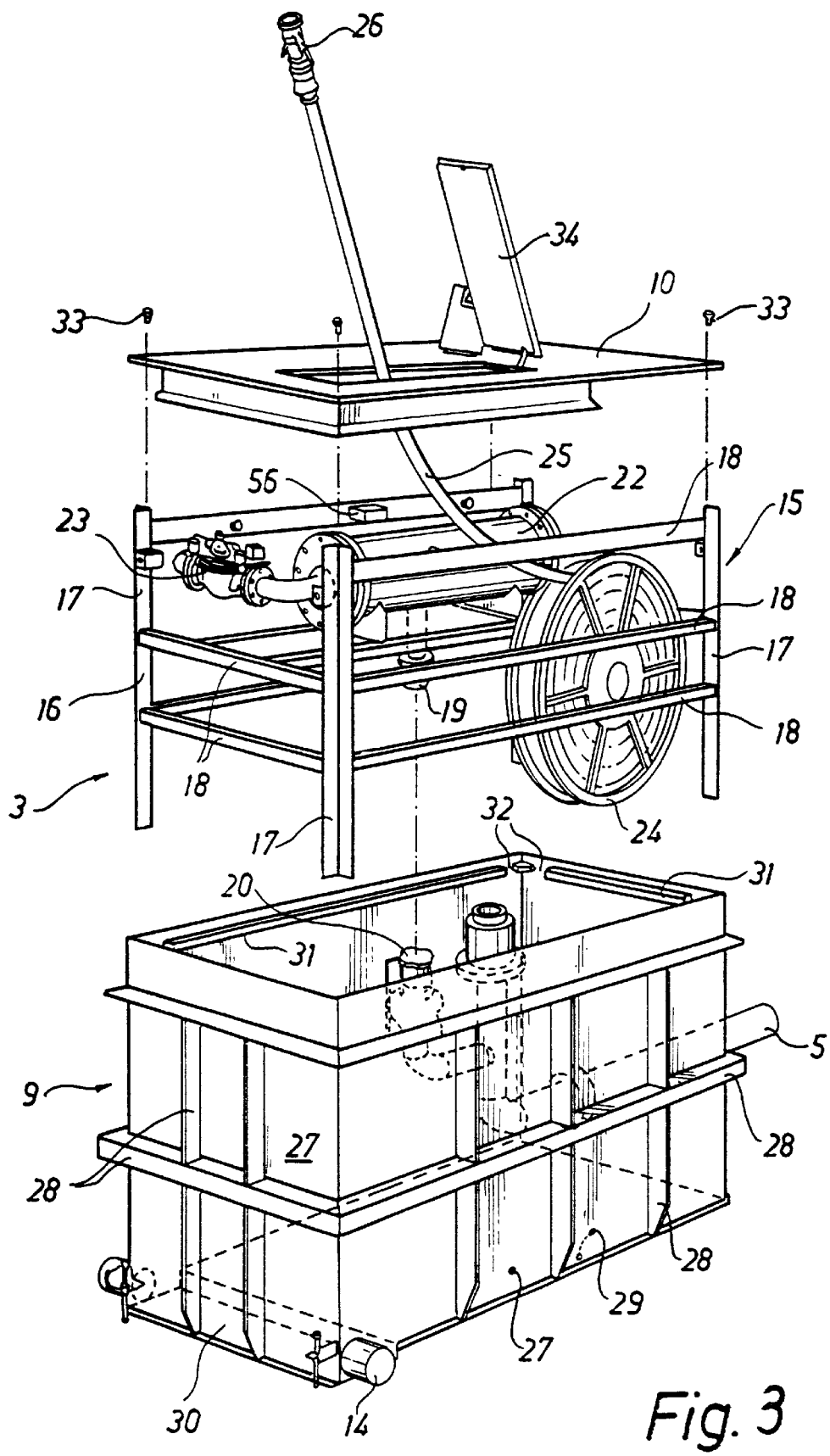
FIG. 3 is a perspective view of the components included in a service box in the inventive service system.

FIG. 3 illustrates the preferred construction of a service box 3 according to the invention. The service box 3 illustrated in FIG. 3 is intended for supplying fuel to the aircraft 1, but the basic composition of the service box 3 in FIG. 3 is also useful when supplying other utilities, and also when discharging waste, such as wastewater.

According to the invention, the service box 3 comprises, in addition to the casing 9 and the cover 10, a cassette 15 which carries all the equipment required for supplying fuel to the aircraft 1 from the fuel line 5 opening into the casing 9.

More specifically, the cassette 15 comprises a frame 16 with four uprights 17 of L-shaped cross-section, which are interconnected by means of a plurality of horizontal beams 18. The equipment supported by the frame 16 and thus included in the cassette 15 comprises a coupling element 19 which, together with a coupling element 20 fixedly mounted in the casing 9, forms a coupling for connecting the equipment of the cassette 15 to the fuel line 5. The equipment of the cassette 16 also comprises a pressure reducer 21, a filter 22, a fuel quantity gauge 23, a swivel connection (not shown) of a fuel filling tube 25 wound onto a tube winder 24.

The cassette 15 is lowerable into the casing 9 and liftable therefrom by means of a conventional, movable lifting device. The casing 9 has four side walls 27, which are reinforced with horizontal and vertical beams 28, and a bottom 29 with a recessed portion 30; from which the drain pipe 14 extends. At the upper edge of the inside of the side walls 27, supporting bars 31 are fixedly mounted for supporting the cover 10, such that the upper face thereof is on the same level as the surrounding ground of the apron 2. Adjacent the corners of the casing 9, slits 32 are formed in the supporting bars 31, said slits 32 constituting guide means for the uprights 17 of L-shaped cross-section, included in the frame 16. When lowering the cassette 15 into the casing 9, the slits 32 provide such guiding of the uprights 17 that the coupling elements 19 and 20 are directly brought into correct engagement with each other.

When the cassette 15 is in its fixed position inside the casing 9, and the cover 10 is placed on the supporting bars 31, the cover 10 can be screwed to the casing 9 by means of screws 33. The cover 10 further comprises an openable door 34, in whose open condition the fuel filling tube 25 can be unwound from the winder 24 and the nozzle 26 can be connected to the fuel intake of the air-craft 1.

The above described construction of a service box 3 with the liftable cassette 15 implies a most considerable simplification on the one hand in the mounting of, in this case, the fuel filling equipment in the box 3 and, on the other hand and above all, in maintenance and repair of the fuel filling equipment. Both the mounting work and the maintenance and repair work can thus be carried out on the cassette 15 when lifted up from the casing 9. If required, a replacement cassette (not shown) can be mounted in the casing 9, while the ordinary cassette 15 is being maintained or repaired. Thus, the docking position can be used practically continuously, thereby making it possible to keep up the high frequency of serviced aircraft that a service system with service boxes lowered into the ground permits.

Figure 4:
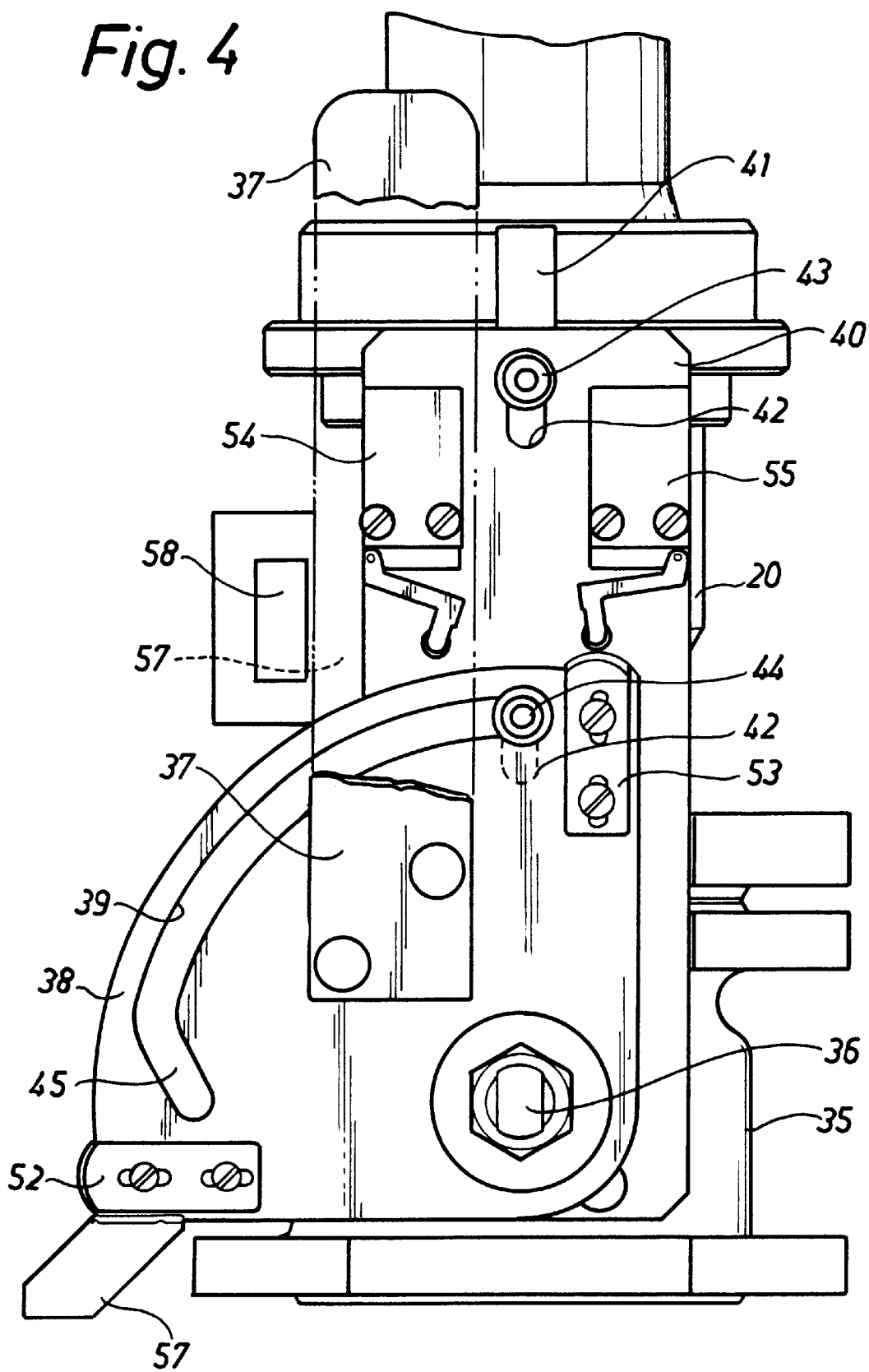
FIGS. 4 and 5 are a front view and a side view of a coupling which is included in a service box for fuel supply in the service system according to the invention.
Figure 5:
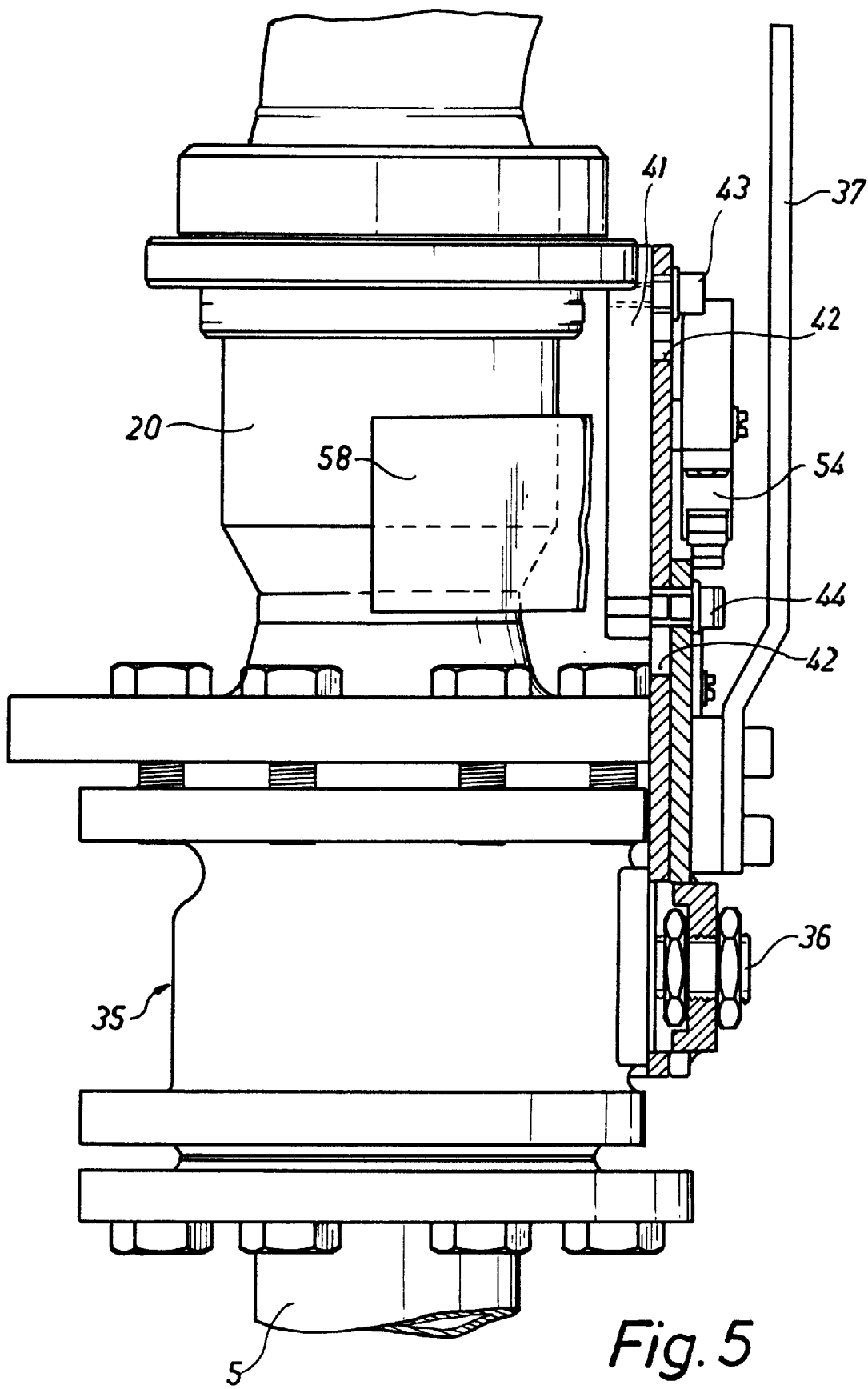

In view of the fuel being supplied in the fuel line 5 at very high pressure, it is most important that the coupling elements 19, 20 are not disconnected from each other, before the fuel line 5 has been closed against the coupling element 20. FIGS. 4–7 illustrate the coupling comprising the coupling elements 19, 20, and a shut-off valve 35 in the fuel line 5 adjacent the coupling element 20. This combined valve and coupling is such that a leakage from the fuel line 5 via the coupling element 20 to the surrounding atmosphere is impossible. FIGS. 4 and 5 illustrate the coupling element 20 connected to the fuel line 5 via a shut-off valve 35 in the form of a ball valve, which is actuated between open and closed position by means of an arm 37 which is pivotable around a shaft 36. A cam disc 38 with a cam guiding groove 39 is fixedly connected to the arm 37. In FIGS. 4 and 5, the ball valve 35 is shown in its closed position, the arm 37 being vertically directed. By pivoting the arm 37 and, thus, the cam disc 38 clockwise through 90° in FIG. 4, the valve 35 is actuated to its open position.

A plate 40 is fixed to the valve 35 and extends behind the cam disc 38 upwards along the coupling element 20. A bar 41 is mounted in vertically directed slits 42 in the plate 40 by means of bolts 43, 44, the bolt 44 extending through the guiding groove 39 of the cam disc 38.

The guiding groove 39 has a constant distance to the centre of the shaft 36 along the main part of its extent, but has at one end a portion 45 with a decreasing distance to the centre of the shaft 36. Owing to this design of the guiding groove 39, the bar 41 will be in its upper position when pivoting the arm from the open position of the ball valve 35 to the closed position thereof, whereupon in continued pivoting of the arm 37 in the same direction, the bolt 44 will be pulled, by coacting with the portion 45, towards the shaft 36 and, thus, also the bar 41. Thus, the bar 41 will perform a vertical translational motion during the very last part of the motion of the arm 37 in the direction away from the open position of the valve to the closed position thereof. This translational motion of the bar 41 is used to disconnect the coupling containing the coupling elements 19 and 29.

Figure 6:
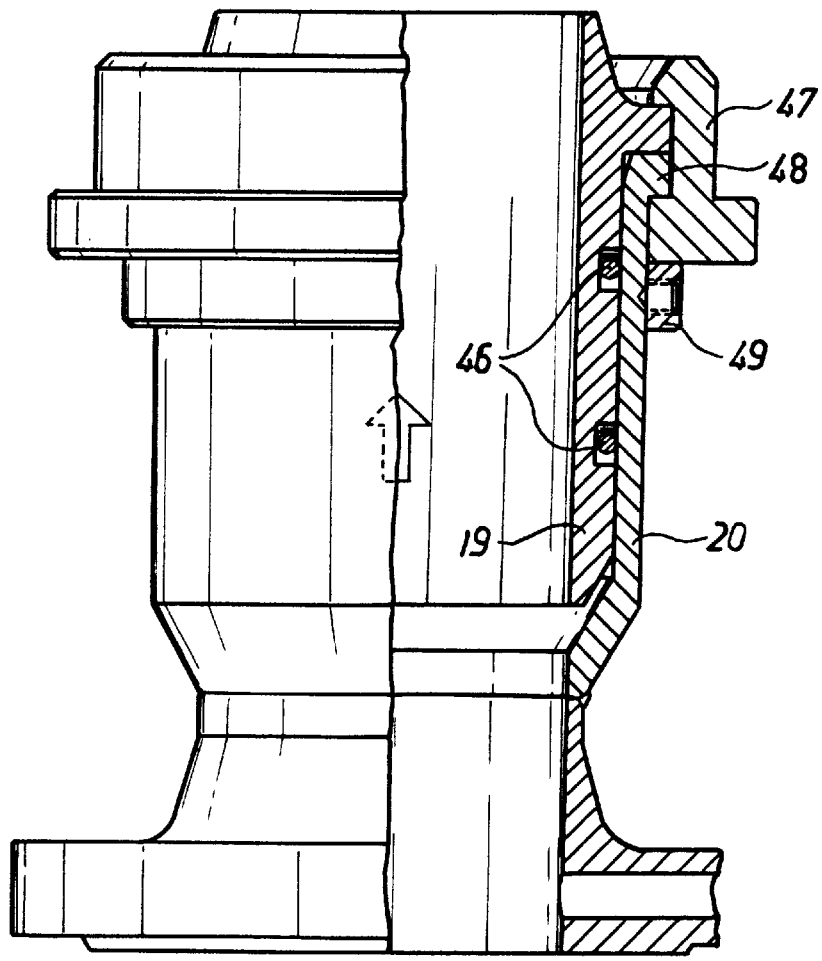
FIG. 6 is a side view, partly in cross-section, of a coupling element included in the coupling according to FIGS. 4 and 5.
Figure 7:
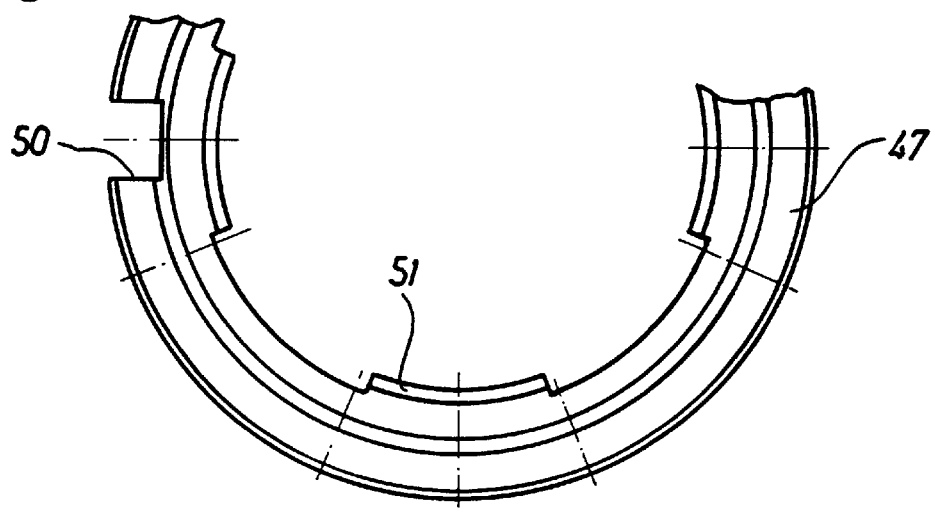
FIG. 7 is a top plan view of a coupling ring included in the coupling element in FIG. 6.

As shown in FIG. 6, the coupling elements 19 and 20 seal against one another by means of two O-rings 46 in the interconnected position. For locking the coupling elements 19, 20 in the interconnected position, a rotatable coupling ring 47 is mounted at the top of the coupling element 20, where the coupling ring 47 is secured against axial displacement between a flange 48 at the top of the coupling element 20 and an adjusting ring 49 whose axial position is fixable. As shown in FIG. 7, the coupling ring 47 has a peripheral recess 50 in a position corresponding to the bar 41, for receiving this bar 41, which thus secures the coupling ring 47 against rotation. The coupling ring 47 further comprises a number of inwardly directed lugs 51, and the coupling element 19 has an outer flange of a form complementary to the opening of the coupling ring 47.

When the cassette 15 is lowered into the casing 9, the ball valve 35 is closed and the coupling ring 47 is in such a rotary position that the coupling element 19 is inserted into the coupling element 20 to the position illustrated in FIG. 6. Subsequently, the coupling ring 47 is rotated such that its lugs 51 block a pulling-out of the coupling element 19 from the coupling element 20, and the recess 50 is positioned in the extension of the bar 41. If the arm 37 is now rotated counterclockwise in FIG. 4, first the bar 41 will be pushed up with its uppermost part into the recess 50, whereby the rotary position of the coupling ring 47 will be locked and the coupling element 19 cannot be pulled out from the coupling element 20. Consequently, the ball valve 35 can be opened without any risk, which is carried out by pivoting the arm 37 further counterclockwise until it takes the vertically upwardly directed position as shown in FIGS. 4 and 5.

For indicating the stop positions of the arm 37 and, thus, the open and closed positions of the valve 35, the cam disc 38 has two carriers 52 and 53, respectively, which in the open position and the closed position, respectively, each actuate a limit switch 54 and 55, respectively. In this way, the position of the ball valve 35 can, of course, be indicated in the central unit 8. The carrier 52 and the limit switch 54 can also be used to actuate an electrically operated securing means 56 on the frame 16 of the cassette 15. This securing means 56 can have a piston engaging under, for example, the supporting bar 31, such that a raising of the cassette 15 out of the casing 9 is prevented by this securing means 56 as long as the limit switch 54 has not detected, under the action of the carrier 52, the closed position of the ball valve 35.

To prevent opening of the ball valve 35 when the cassette 15 has been lifted up from the casing 9, the cam disc 38 has a lug 57, which by engagement with a manually extractable lockable piston 58 prevents opening of the ball valve 35 by pivoting the arm 37 in counterclockwise direction from the closed position of the valve 35.

Figure 8:
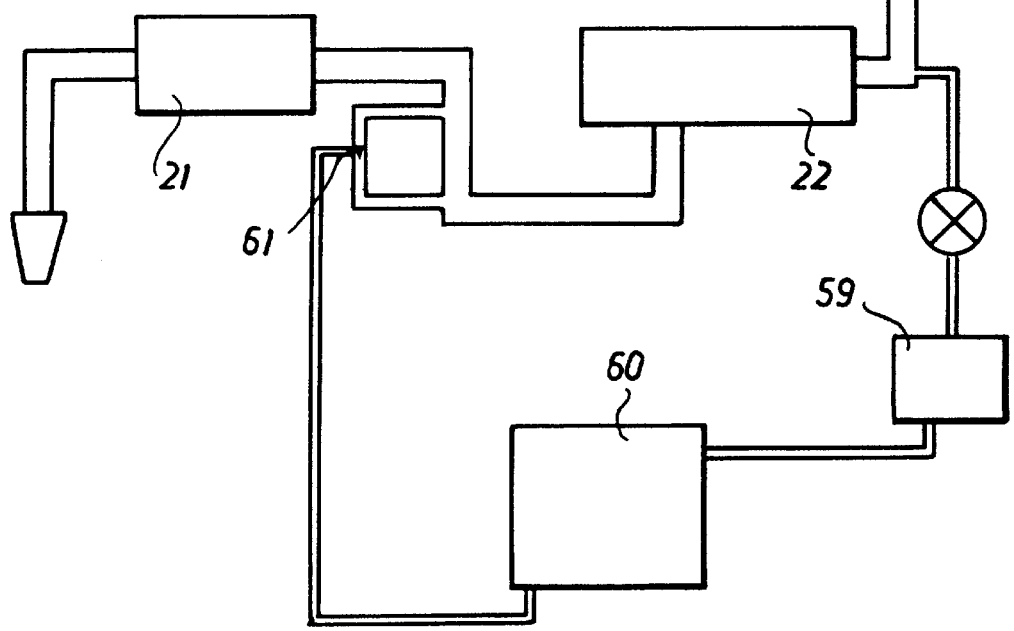
FIG. 8 is a block diagram of the equipment included in the service box shown in FIG. 3.

As shown in FIG. 8, fuel testing equipment comprises a test chamber 59 with an inlet line provided with a valve and extending from the outlet side of the filter 22, and an outlet line to a collecting chamber 60, which in turn has an outlet line opening into a venture nozzle 61 in a line parallel to the line between the pressure reducer 21 and the filter 22. By this testing equipment, the quality of the fuel supplied to an aircraft can be automatically tested, and the amount of fuel used for the testing can be returned to the inlet side of the filter 22. As a result, all manual handling of the fuel for carrying out the testing is avoided.

The invention is not restricted to the embodiment described above, but is generally applicable to any medium or utility which is intended to be supplied or discharged in a docking position for practically every type of craft. Especially for aircraft, the invention thus is applicable not only to fuel, but also to electricty, drinking-water, air for air conditioning, and wastewater.

I claim:

1. A service system for at least one docking position for a craft, which requires the supply of various utilities, and the discharge of waste, said system comprising a plurality of service boxes (3) lowered into the ground in the docking position, which each comprise a casing (9) forming the side walls (27) and the bottom (29) of the box, and a cover (10) forming the top of the service box (10), said service boxes each accommodating a connecting device (26–21) for connecting an underground supply or discharge conduit (4, 5) opening into the service box and connected to a utility source (8) and a waste receiver (8), respectively, to a corresponding inlet and outlet, respectively, of the craft, characterised in that at least one of said service boxes (3) comprises a cassette (15) accommodated in said casing (9) and liftable up from said casing when the cover (10) is removed, the connecting device (21–26) of said service box and the associated equipment, if any, being mounted in said cassette.

2. The service system as claimed in claim 1, characterised in that said connecting device (21–26) and the associated supply or discharge conduit (4, 5) each comprise a coupling element (19, 20) which are adapted to be interconnected when lowering the cassette (15) into the casing (9) and to be disconnected, respectively, when lifting up the cassette from said casing.

3. The service system as claimed in claim 2, characterised in that said coupling elements (19, 20) each have a vertical center axis.

4. The service system as claimed in claim 2, characterised by a locking means (41) for said coupling elements (19, 20) in a service box (3), said locking means needing to be released, before said coupling elements can be disconnected by lifting up the cassette (15) from said casing (9).

5. The service system as claimed in claim 4, characterised by a securing means (56) which is adapted to secure said cassette (15) against lifting up from said casing (9) as long as said locking means (41) is not released.

6. The service system as claimed in claim 5, characterised in that said discharge conduit (5) comprises a shut-off valve (35) adjacent its coupling element (20), and that an actuating means (37) for said shut-off valve is adapted to release said locking means (41) merely in the closed position of the shut-off valve.

7. The service system as claimed in claim 6, characterised in that the actuating means (37) of said shut-off valve (35) comprises an arm which is pivotable for the shutting-off operation and comprises a cam disc (38) for generating a translational motion of said locking means (41).

8. The service system as claimed in claim 7, characterised in that said locking means (41) is a bar, which is adapted, in the locked position, to prevent rotation of a coupling ring (47) joining said coupling elements (19, 20).

9. The service system as claimed in claim 1, characterised in that said cassette (15) comprises a frame (16) having vertical uprights (17) for guiding engagement with corresponding slits (32) at the upper edge of said casing (9).

* * * * *